United States Patent [19]

Ushijima et al.

[11] 4,324,321
[45] Apr. 13, 1982

[54] AUTOMATIC TRANSMISSION FOR AUTOMOBILES

[75] Inventors: Fumihiro Ushijima; Kagenori Fukumura, both of Toyota, Japan

[73] Assignee: Toyota Jidosha Kogyo Kabushiki Kaisha, Toyota, Japan

[21] Appl. No.: 120,999

[22] Filed: Feb. 13, 1980

[30] Foreign Application Priority Data

Mar. 9, 1979 [JP] Japan .................................. 54-27955

[51] Int. Cl.³ ............................................ B60K 41/24
[52] U.S. Cl. ...................................... 192/13 R; 192/9; 74/783
[58] Field of Search ............ 192/9, 18 A, 18 R, 12 C, 192/12 R, 13 R, 4 A, 109 F, 3.58; 74/783, 782, 781 R

[56] References Cited

U.S. PATENT DOCUMENTS

| | | | |
|---|---|---|---|
| 4,072,220 | 2/1978 | Hamada | 192/3.58 X |
| 4,108,291 | 8/1978 | Zenker | 192/18 A X |
| 4,142,614 | 3/1979 | Fujioka | 192/4 A |
| 4,183,424 | 1/1980 | Rumyantsev et al. | 192/3.58 |
| 4,219,109 | 8/1980 | Ushijima et al. | 192/109 F |
| 4,225,029 | 9/1980 | Ushijima | 192/18 A X |

*Primary Examiner*—George H. Krizmanich
*Attorney, Agent, or Firm*—Stevens, Davis, Miller & Mosher

[57] ABSTRACT

An automatic transmission for automobiles having a gear means, a clutch and a brake, the engagement and disengagement of the clutch and the brake being changed over for shifting speed stages, wherein one of the mutually engageable friction elements of the brake is mounted to a housing of the transmission so as to be rotationally shiftable with respect to the housing through a small angle so that forward or backward rotary shifting of the friction element operates a transducer which generates an electric signal which, by means of an electric circuit means, operates a timing valve which is electrically controlled and controls supply or exhaust of oil pressure to or from the brake.

2 Claims, 7 Drawing Figures

AUTOMATIC TRANSMISSION FOR AUTOMOBILES

BACKGROUND OF THE INVENTION

The present invention relates to an automatic transmission for automobiles, and, more particularly, to an improvement of an automatic transmission for automobiles with regards to control of its speed shift timing.

In an automatic transmission for automobiles including a gear means and a plurality of friction engaging means and adapted to establish various speed stages in accordance with selective engagement of said friction engaging means, if the timing of the changing-over operation of the friction engaging means is not properly controlled, poor shift performance, such as to cause a shock to or a temporary revolving-up speed increase of the engine, is caused. Conventionally, as a means for accomplishing smooth shifting in an automatic transmission for automobiles, it has been proposed to incorporate a one-way clutch in the transmission, and it is usual to incorporate a one-way clutch in the shifting structure for changing-over in the first and second speed stages. However, if one-way clutches are incorporated in all the shifting structures for changing-over various speed stages, the automatic transmission will become unduly big and expensive. Furthermore, since a one-way clutch idles in the reverse direction, it nulifies engine braking, thereby making it necessary to provide another means for effecting engine braking, and making the structure of an automatic transmission more complicated. Therefore, it is desirable that the timing for engaging and disengaging friction engaging means such as clutches and brakes is properly controlled without employing one-way clutches.

SUMMARY OF THE INVENTION

It is therefore the primary object of the present invention to provide an improved automatic transmission for automobiles including means for properly controlling the timing for engaging and disengaging friction engaging means, wherein said means for controlling the operational timing of the friction engaging means incorporates a mechanical and electrical control structure which operates in accordance with the conditions of frictional engagement of friction engaging means so as to generate an electric signal and a timing valve which is actuated by said electrical signal and controls supply and exhaust of oil pressure to oil servo means of the friction engaging means.

Another object of the present invention is to provide an automatic transmission of the abovementioned type having upshift timing control means which rapidly exhausts oil pressure from a low speed friction engaging means thereby rapidly disengaging the low speed friction engaging means when a high speed friction engaging means is engaged so far that it transmits a predetermined medium level of torque.

Still another object of the present invention is to provide an automatic transmission of the abovementioned type having a downshift timing control means which throttles the supply of oil pressure to an oil servo means of a low speed friction engaging means when the low speed friction engaging means is engaged so far that it transmits a predetermined relatively low level of torque until a rotary member of a high speed friction engaging means completely stops its rotation after disengagement of the high speed friction engaging means.

A further object of the present invention is to provide an automatic transmission of the abovementioned type having a timing control means including a valve which is completely changed over between two opposite shift positions in accordance with said electric signal and a pressure modulating valve which is selectively incorporated in a passage which supplies oil pressure to said low speed friction engaging means by said change-over valve.

Further objects of the present invention will be in part obvious and will be in part particularly pointed out in the following description.

BRIEF DESCRIPTION OF THE DRAWING

The present invention will become more fully understood from the detailed description given hereinbelow and the accompanying drawings which are given by way of illustration only and thus are not limitative of the present invention and wherein.

DESCRIPTION OF THE PREFERRED EMBODIMENT

Figure 1:
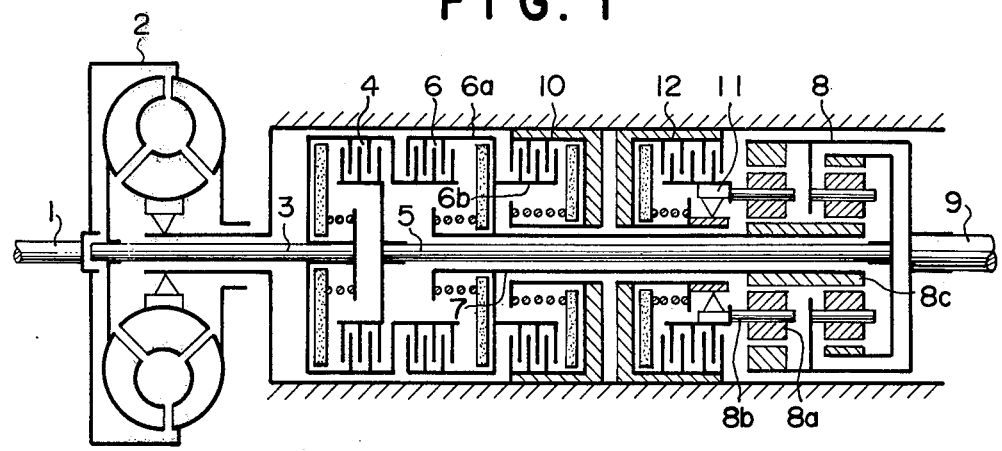
FIG. 1 is a rather diagrammatical sectional view showing an example of an automatic transmission for automobiles in which the present invention can be incorporated.

Referring to FIG. 1, the automatic transmission herein shown comprises a shaft 1 which is an output shaft of an engine not shown in the figure as well as an input shaft of a fluid torque converter 2, while a shaft designated by 3 forms an output shaft of the fluid torque converter as well as an input shaft of an assembly of gear means and friction engaging means. The shaft 3 is selectively connected with a first intermediate shaft 5 by means of a front clutch 4 and is also selectively engaged with a second intermediate shaft 7 by means of a rear clutch 6. The first and second intermediate shafts 5 and 7 are connected with a planetary gear means 8 of the Simpson type having an output shaft 9. The rear clutch 6 has a rear clutch drum 6a forming one of the mutually engaging means of the rear clutch and having a hub portion 6b which also forms a part of the friction engaging means providing a front brake 10. Pinions 8a of the planetary gear means 8 are supported by a carrier 8b, while a one-way clutch 11 and a rear brake 12 are connected with the carrier 8b so as selectively to brake the rotation of the carrier 8b.

As well known by those having ordinary skill in the art, when the front clutch 4 is engaged, the transmission operates in the first speed condition, wherein the output shaft 9 rotates in the same direction as the input shaft 3 at the largest reduction ratio. In this case, the one-way clutch 11 is automatically engaged. If the rear brake 12 is also engaged, the input shaft 3 can be reversely driven by the output shaft 9, whereby engine braking can be effected. When the front clutch 4 and the front brake 10 are engaged, the transmission operates in the second speed condition. In this case, the output shaft 9 is driven by the input shaft 3 in the same direction at a medium reduction ratio. When the front clutch 4 and the rear clutch 6 are engaged, the transmission operates in the third speed condition or in the directly connected condition, wherein the output shaft 9 is driven by the input shaft 3 in the same direction at a 1 to 1 ratio. When the rear clutch 6 and the rear brake 12 are engaged, the transmission operates in the reverse condition, wherein the output shaft 9 is driven by the input shaft 3 in the reverse direction at a large reduction ratio.

In this type of transmission, the present invention may conveniently be incorporated for controlling the timing of upshift and downshift between the second speed and the third speed.

Figure 2:
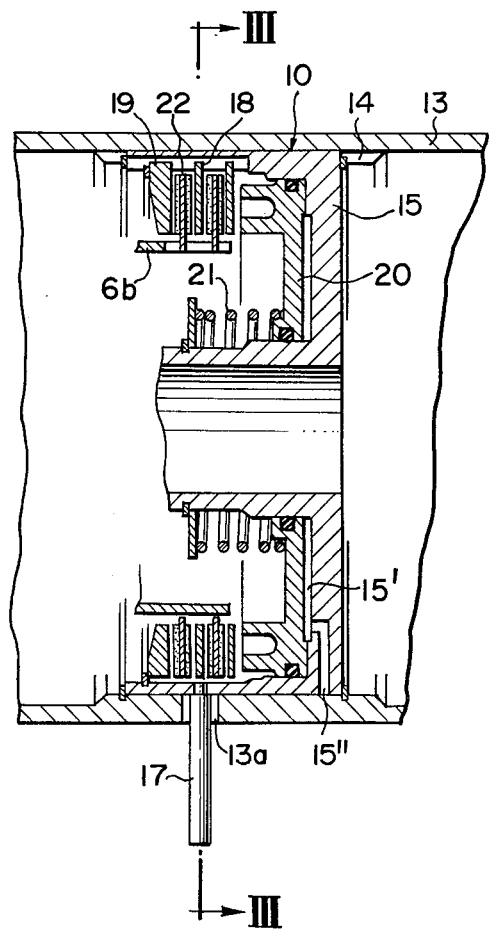
FIG. 2 is a partial sectional view corresponding to a part of the automatic transmission shown in FIG. 1 in which the present invention is incorporated.
Figure 3:
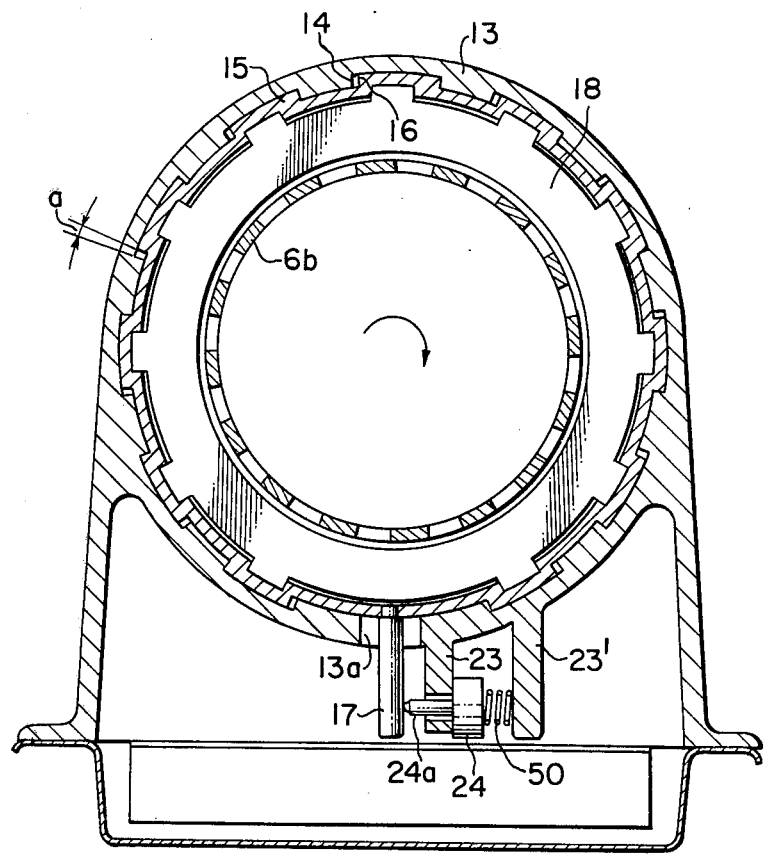
FIG. 3 is a cross sectional view along line III—III in FIG. 2.

Referring next to FIG. 2 and 3, the transmission housing designated by 13 has splines 14 formed at an inner wall portion thereof having a certain peripheral width, while the drum of the front brake 10 designated by 15 has splines 16 formed at its outer peripheral portion and having a certain peripheral width which is a little smaller than that of the splines 14 by an amount shown by a in FIG. 3. By this arrangement, the splines 16 engage the splines 14 so as to be rotatable to and fro by a small angle corresponding to the clearance a. The transmission housing has an opening 13a through which a rod 17 is passed and mounted to the drum 15 so that the rod 17 is angularly shifted around the central axis of the drum 15 as it rotates forward or rearward within a small angle corresponding to the clearance a.

At the inside of the drum 15 are mounted a plurality of annular plates 18 and a reaction plate 19 by means of a spline engagement as in the conventional structure, these plates serving as friction elements of the friction engaging means. Furthermore, an annular piston 20 is mounted in a corresponding annular cylinder bore formed in the drum 15 and is biased rightward in FIG. 2 by the action of a coil spring 21. The combination of the piston and the cylinder constitutes an oil servo means for operating the front brake 10. Between the annular plates 18 as well as between the annular plates 18 and the reaction plate 19 are provided annular lining plates 22 which are connected with the hub portion 6b of the rear clutch drum 6a by means of a spline engagement.

As obvious from the structure shown in FIG. 2, when oil pressure is supplied to a cylinder chamber 15' through a passage 15", the piston 20 is driven leftward in FIG. 2 so that the friction elements 18, 19 and 22 are pressed together so as to engage frictionally with one another thereby putting the rear brake 12 into operation so as to restrict the rotation of the rear clutch drum 6a as well as the sun gear 8c of the planetary gear means 8 connected therewith. As shown in FIG. 3, a load cell 24 is provided as mounted between support lugs 23 and 23' formed in the transmission housing, as resiliently supported against rightward movement in FIG. 3 by a compression coil spring 50 interposed between the load cell 24 and the support lug 23'. The load cell 24 has a feeler 24a which is axially pressed by the rod 17 when the drum 15 is driven anticlockwise as viewed in FIG. 3 so as to cancel the clearance a.

Figure 4:
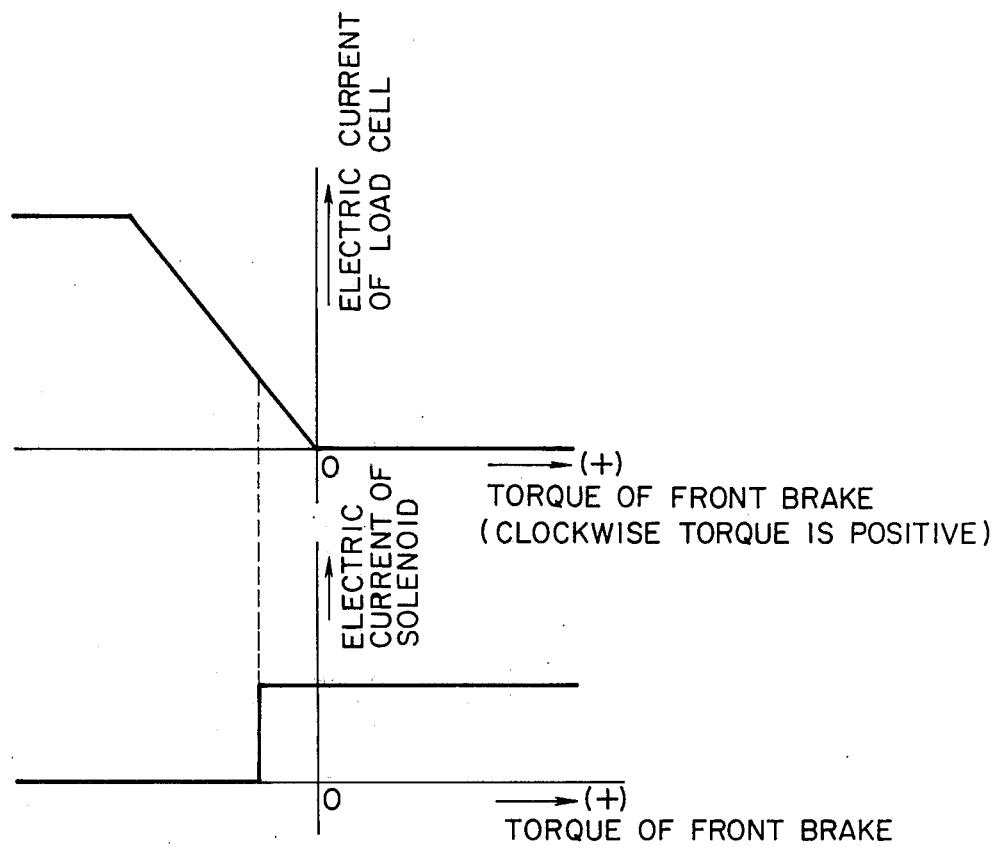
FIG. 4 shows performances of the load cell and the solenoid relative to the torque of the front brake.

FIG. 4 shows the performance of the load cell 24 relative to the torque applied to the front brake 10, i.e. the torque applied to the drum 15. As apparent from this graph, the load cell 24 generates an electric current larger than a predetermined level which triggers an electric circuit not shown but explained hereinunder so as to deenergize a solenoid shown and explained hereinunder when its feeler 24a is pressed rightward in FIG. 3 by a force stronger than a predetermined value.

Figure 5:
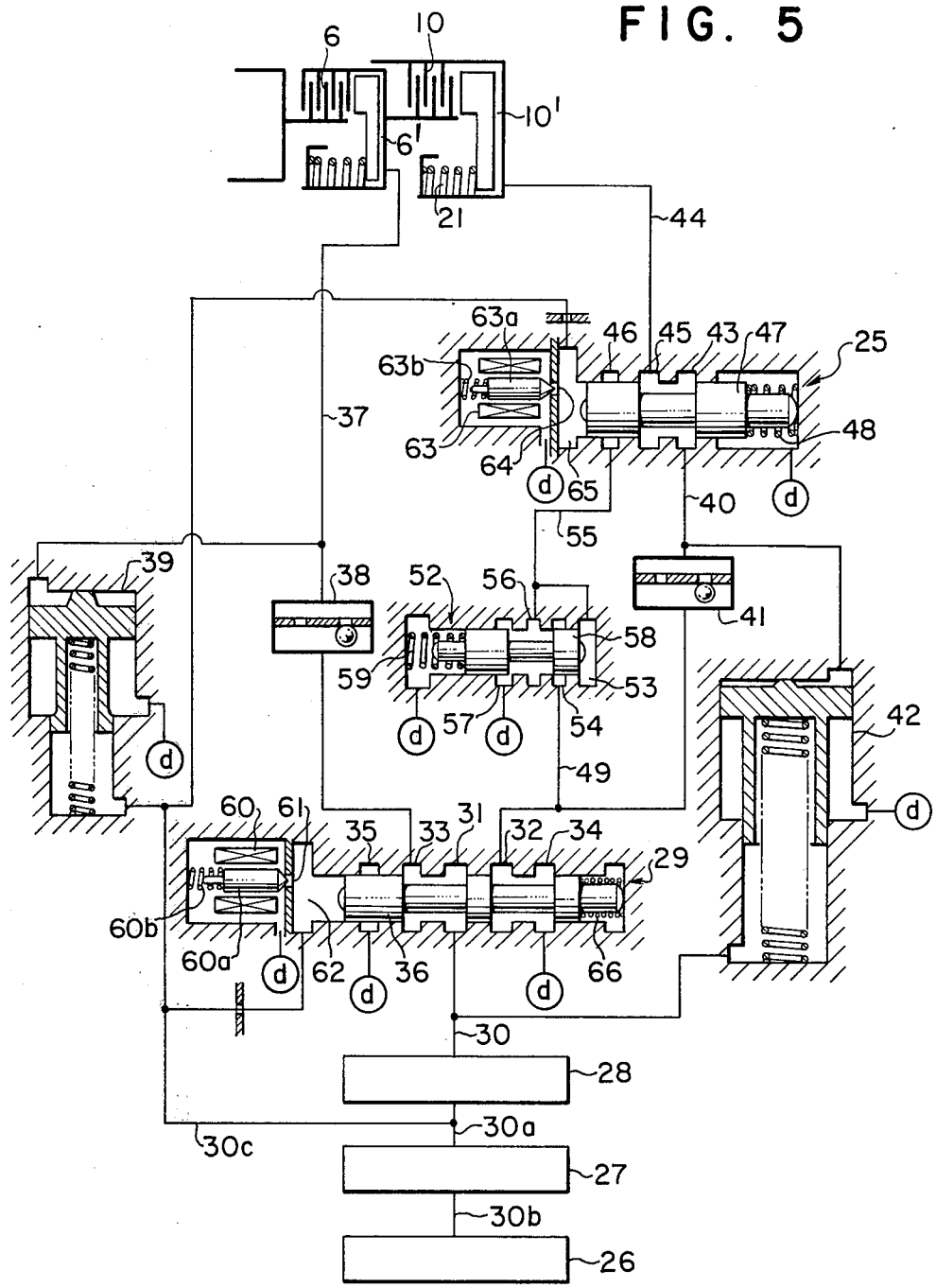
FIG. 5 is a diagram showing an oil pressure circuit means incorporated in the automatic transmission of the present invention.

FIG. 5 is a diagram showing an oil pressure circuit means for operating the rear clutch 6 and the front brake 10. In the diagram, blocks 26, 27 and 28 represent a source means of oil pressure such as one including an oil reservoir and an oil pump, a line pressure regulating valve and a 1-2 shift valve, respectively. These control elements may be of any conventional types which are well known in the art. The source means 26 supplies oil to the line pressure regulating valve 27 through a passage 30b. The line pressure regulating valve 27 supplies oil at a regulated pressure to the 1-2 shift valve 28 through a passage 30a, while the line pressure is supplied to various portions of the oil pressure circuit means through various passages including a passage 30c. The 1-2 shift valve 28 delivers the line pressure through a passage 30 when it is shifted to its upshift position for effecting the second or higher speed stage. 29 designates a 2-3 shift valve having a port 31 in which the line pressure conducted through the passage 30 is supplied. The line pressure supplied to the port 31 is selectively supplied to a port 32 or a port 33 in accordance with the shifting operation of a valve spool 36, while the ports 32 and 33 are selectively connected to drain port 34 and 35, respectively, in accordance with the shifting of the valve spool 36. The shifting of the valve spool 36 between the two opposite positions is effected by generating a pressure in or exhausting the pressure from a pressure chamber 62 due to operation of a solenoid 60. When the transmission is to be shifted to the second speed stage, the solenoid 60 is energized by an electric circuit means not shown in the figure, whereby a port 61 controlled by an armature 60a adapted to be driven by the solenoid 60 against a compression coil spring 60b is opened, so as to drain the chamber 62 and to make the spool 36 shift leftward in FIG. 5 by the action of a compression coil spring 66. By contrast, when the transmission is to be shifted to the third speed stage, the solenoid 60 is deenergized, whereby the port 61 is closed and a pressure is generated in the chamber 62, which drives the spool 36 rightward in FIG. 5 against the action of the compression coil spring 66. When the spool 36 is shifted leftward in the figure, the line pressure is conducted to the port 32 so as to be finally supplied to an oil servo means 10' of the front brake 10, while the port 33 connected with an oil servo means 6' of the rear clutch 6 is connected to the drain port 35 so as to exhaust oil pressure from the oil servo means 6'. On the other hand, when the spool 36 is shifted rightward in the figure, the line pressure supplied through the passage 30 is conducted to the port 33 so as to be supplied to the oil servo means 6' of the rear clutch 6, while the port 32 connected with the oil servo means 10' of the front clutch 10 is connected to the drain port 34 so as to exhaust oil pressure from the oil servo means 10'. As described before, when the front brake 10 is engaged by the supply of oil pressure to the servo means 10', the transmission operates in the second speed condition, while when the rear clutch 6 is engaged by the supply of oil pressure to the servo means 6', the transmission operates in the third speed condition.

In the oil passage 37 connecting the port 33 of the 2-3 shift valve to the oil servo means 6' of the rear clutch there is a throttling means 38, while an accumulator 39 is connected to the passage 37 at the downstream side of the throttling means 38 as seen from the side of the port 33. Similarly, in the passage 40 extending from the port 32 of the 2-3 shift valve towards the oil servo means 10' of the front brake 10 until it reaches a timing valve 25 and a throttling means 41, while an accumulator 42 is connected to the passage 40 at the downstream side of the throttling means 41 as seen from the side of the port 32.

The timing valve 25 has a first port 43 connected with the passage 40, a second port 45 connected with the oil servo means 10' of the front brake 10 by means of a passage 44, and a third port 46, these ports being controlled by a spool element 47. The spool element 47 is shifted between a first shift position in which it connects the port 45 to the port 43 while isolating the port 45 from the port 46 and a second shift position in which it connects the port 45 to the port 46 while isolating the port 45 from the port 43, by generating a pressure in or exhausting the pressure from a pressure chamber 65. The pressure in the pressure chamber 65 is controlled by a solenoid 63 which is energized or deenergized by an electric circuit means not shown in the figure which is controlled by the load cell 24 in a manner as shown in the graph of FIG. 4. When the load cell 24 is not generating an electric current greater than a predetermined value in operation, the solenoid 63 is energized so as to drive an armature 63a leftward in the figure against the action of a compression coil spring 63b so as to open a port 64, whereby the pressure chamber 65 is drained so that the spool element 47 is shifted leftward in the figure by the action of a compression coil spring 48, thereby connecting the port 45 with the port 46. On the other hand, when the load cell 24 generates an electric current greater than a predetermined value, the solenoid 63 is deenergized, whereby the port 64 is closed, thereby generating a pressure in the pressure chamber 65 which drives the spool element 47 rightward in the figure against the action of the compression coil spring 48 so as to connect the port 45 with the port 43.

A pressure modulating valve 52 is connected so as to supply a pressure modulated from the line pressure which appears in the port 32 of the 2-3 shift valve 29 to the port 46 of the timing valve 25. This pressure modulating valve 52 has a port 54 connected to the port 32 by a passage 49, a port 56 connected to the port 46 by a passage 55, a pressure chamber 53 connected with the port 56, a drain port 57, a spool element 58 which controls connection between the ports 54 and 56 as well as connection between the ports 56 and 57, and a compression coil spring 59. By this arrangement, the pressure which appears in the port 56 and is supplied through the passage 55, the timing valve 25 and the passage 44 to the oil servo means 10' when the spool element 47 of the timing valve is shifted leftward in the figure is controlled at a constant level determined by the spring force of the spring 59. This constant pressure is adjusted to such a level which effects half engagement of the front brake 10 by overcoming the force of the return spring 21, so that the brake drum 15 is driven clockwise in FIG. 3, so as positively to release the load cell 24, thereby effecting energization of the solenoid 63, so that the spool element 47 of the timing valve 25 is shifted leftward in FIG. 5. A pressure modulating valve of this kind is also useful when the timing for changing over engagement of two reciprocally operating friction engaging means is determined from comparison of rotational speeds of the input and output shafts.

Figure 6:
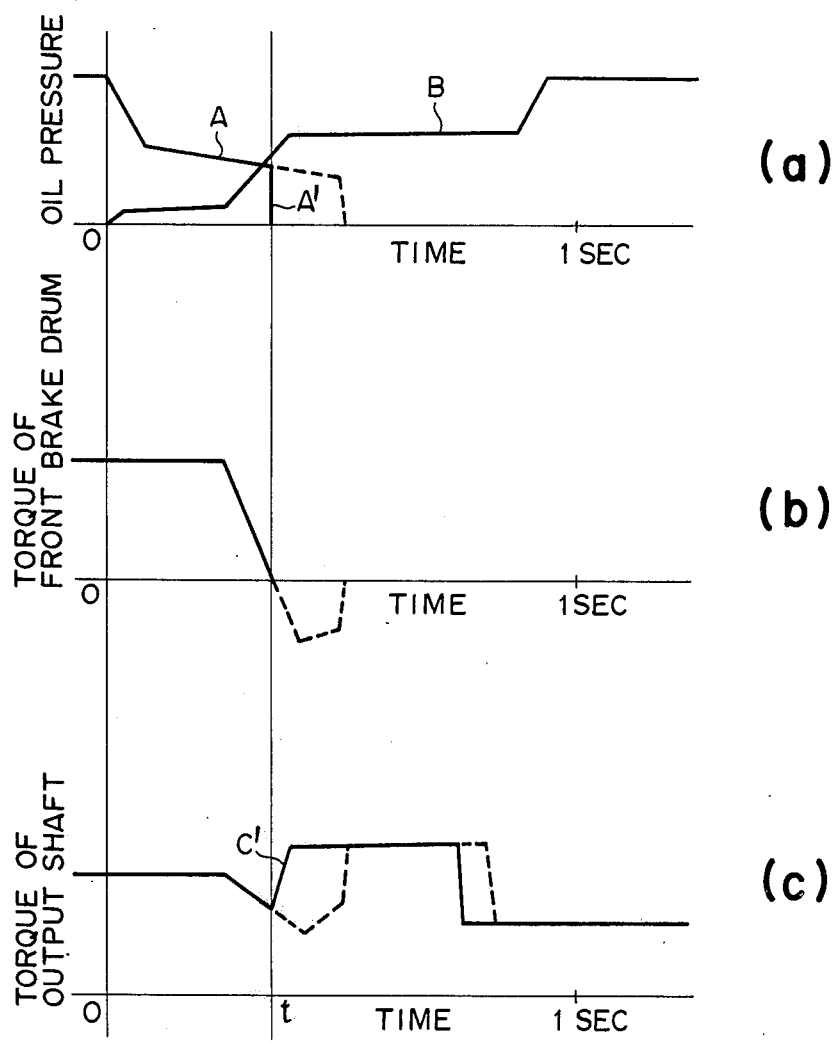
FIG. 6 shows graphs expressing upshift performances of the automatic transmission of the present invention.
Figure 7:
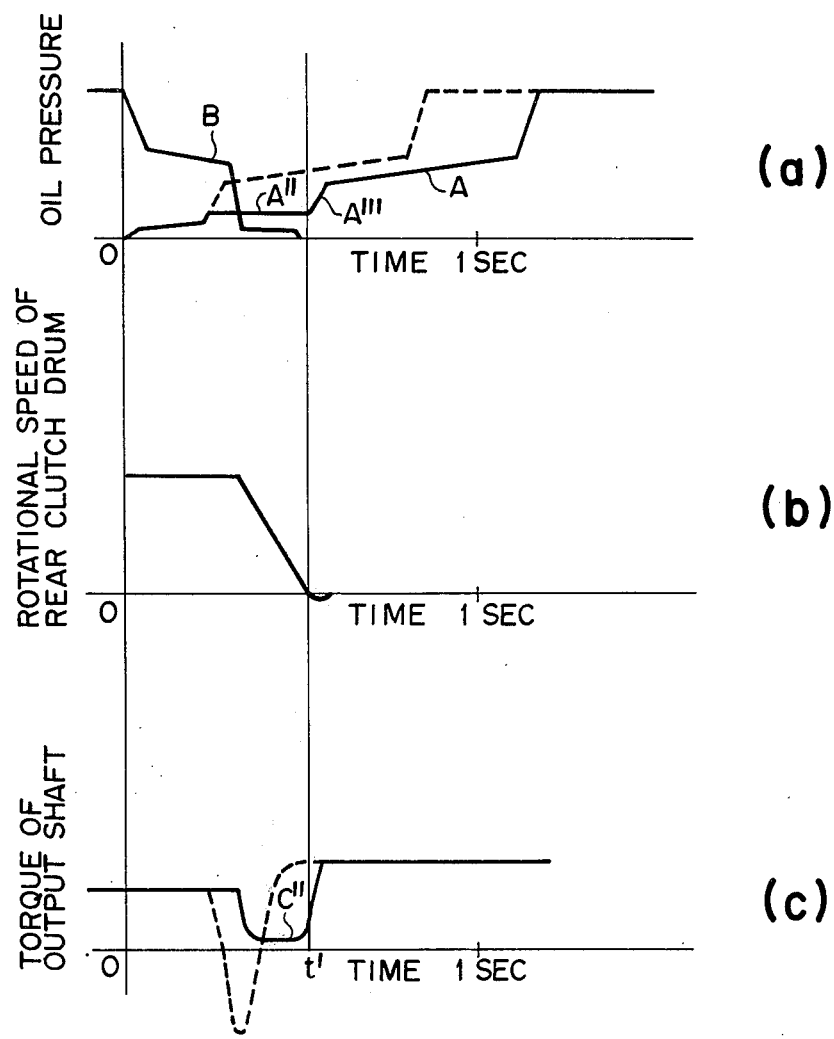
FIG. 7 shows graphs expressing downshift performances of the automatic transmission of the present invention.

The operation of the automatic transmission of the present invention will be explained with reference to FIGS. 4, 6 and 7. When the transmission is operating in the second speed condition, the front brake drum 15 is driven in the direction opposite to the rotational direction of the engine, i.e. anticlockwise as viewed in FIG. 3. Therefore, the rod 17 presses the load cell 24, so that the load cell generates a current larger than a predetermined level, whereby the solenoid 63 is deenergized by an electric circuit means not shown in the figure, thereby shifting the spool 47 of the timing valve 25 rightward as shown in FIG. 5. In this condition, the port 43 and 45 of the timing valve 25 are connected with each other and the oil servo means 10' of the front brake 10 is supplied with oil pressure through the passage 40 including the throttling means 41 and the port 43 and 45 of the timing valve 25. On the other hand, the oil servo means 6' of the rear clutch 6 is exhausted through the passage 37 and the port 33 of the 2-3 shift valve 29 to the drain port 35 thereof. Starting from this condition, when the 2-3 shift valve 29 is shifted up so that the spool 36 is shifted rightward in FIG. 5, by the solenoid 60 being deenergized, the line pressure supplied to the port 31 through the passage 30 is then conducted through the port 33 and the passage 37 including the throttling means 38 to the oil servo means 6' of the rear clutch 6. In this case, as well known in the art, the clearance existing between the friction elements forming the rear clutch 6 and the provision of the throttling means 38 and the accumulator 39 produce a pressure building-up performance of the rear clutch 6 as shown by line B in FIG. 6(a). On the other hand, the oil pressure which has been supplied to the oil servo means 10' of the front clutch 10 is exhausted through the passage 44, the timing valve 25, the passage 40 including the throttling means 41, and the port 32 of the 2-3 shift valve 29 to its drain port 34. In this case, also as well known in the art, by the provision of the accumulator 42 and the throttling means 41, the oil pressure in the oil servo means 10' lowers in accordance with a process as shown by line A in FIG. 6(a). Thus, the rear clutch 6 is gradually engaged while the front brake 10 is gradually disengaged. In the initial stage of this upshifting wherein the friction engagement force of the rear clutch 6 is relatively low, it slips and does not transmit any substantial torque, and therefore the front brake drum 15 is maintained in the anticlockwise biased condition in which the rod 17 presses the load cell 24. However, after the laps of a time t, when the friction engaging action of the rear clutch 6 substantially increases as shown by line B in FIG. 6(a), the rear clutch drum 6a having the hub portion 6b begins to rotate in the normal direction, i.e. clockwise in FIG. 3. If the front brake 10 is still engaged in such a condition, a heavy wearing of the lining plates 22 will be caused. However, in accordance with the present invention, when the rear clutch 6 is substantially engaged, as at the timepoint t in FIG. 6(a), the front brake drum 15 is rotated clockwise in FIG 3 as much as the clearance a thereby releasing the load which has been applied to the load cell 24. Therefore, the solenoid 63 is now energized so as to open the port 64 of the timing valve 25, whereby the spool 47 is shifted leftward in FIG. 5, so as to interrupt connection between the ports 43 and 45 and to connect the port 45 to the port 46, whereby the pressure remaining in the oil servo means 10' is rapidly exhausted through the passage 55 and the port 56 of the modulator valve 52 to its drain port 57. Therefore, the oil pressure of the oil servo means 10' of the front brake 10 is rapidly reduced to zero as shown by line A' in FIG. 6(a). In relation with this, the torque applied to the front brake drum 15 lowers to zero as shown in FIG. 6(b). In this upshifting, the torque of the output shaft varies as shown in FIG. 6(c), wherein it will be noted that the torque is rapidly resumed from the timepoint t as shown by line C' and that the fluctuation of torque caused by upshifting is relatively small.

When the shifting has been completed, i.e., when, for example, a time of 1 second has lapsed after the actuation of the solenoid 60 of the shift valve 29, the solenoid 63 of the timing valve 25 is deenergized, whereby the spool 47 of the timing valve is shifted rightward in FIG. 5.

In FIGS. 6(a)-(c), broken lines included in the performance lines show the performances which will be effected if the present invention is not incorporated in the automatic transmission. In more detail, if the timing control of the present invention is not performed, the complete disengagement of the front brake 10 is delayed beyond the timepoint t, whereby the front brake drum 15 is given a negative torque, and, therefore, the torque of the output shaft is correspondingly reduced thereby causing a greater torque variation during the upshifting, which will cause a strong shift shock.

When the transmission is shifted down from the 3rd speed condition to the 2nd speed condition, the 2-3 shift valve 29 is shifted from the rightward shift position to the leftward shift position as seen in FIG. 5. Then, the oil pressure which has been supplied to the oil servo means 6' of the rear clutch 6 is now exhausted through the passage 37 including the throttle means 38, the port 33 and the drain port 35. As well known in the art, due to the provision of the accumulator 39 and the throttle means 38, the oil pressure in the oil servo means 6' lowers in a manner as shown by line B in FIG. 7(a). On the other hand, oil pressure is supplied from the port 32 of the 2-3 shift valve 29 towards the oil servo means 10' of the front brake 10. In this case, since the drum 15 is in a free and not biased condition, the load cell 24 is not pressed, so that the solenoid 63 of the timing valve 25 is energized or may be energized upon supply of an electric current effected at the same time of supplying an electric current to the solenoid 60 of the 2-3 shift valve. Therefore, the spool element 47 of the timing valve is shifted leftward in FIG. 5 when oil pressure is supplied from the port 32 of the 2-3 shift valve 29 toward the oil servo means 10' after the changing of above the 2-3 shift valve 29. In this case, therefore, the oil servo means 10' is supplied with a low pressure such as, for example, 1.0 Kg/sq.cm produced by the pressure modulating valve 52, instead of the normal line pressure. As the front brake 10 is slippingly engaged by such a low pressure, the drum 15 is positively driven in the same rotational direction as the engine, i.e. clockwise as viewed in FIG. 3. By this delay in supplying the full pressure to the oil servo means 10', the pressure in the oil servo means 10' is maintained at a relatively low level shown by A" in line A in FIG. 7(a). After the rear clutch 6 has been substantially disengaged, the rotation of the drum 6a in the normal direction is rapidly decelerated so as to come to stoppage at a timepoint t' and is then slightly reversed, as shown in FIG. 7(b). Corresponding to this behavior of the rear clutch drum 6a, the rod 17 connected with the front brake drum 15 is driven anticlockwise as viewed in FIG. 3, whereby the load cell 24 is pressed, the solenoid 63 of the timing valve 25 is deenergized, and the spool 47 is shifted rightward in FIG. 5 so as to connect the ports 43 and 45. Therefore, at the timepoint t' the oil pressure in the oil servo means 10' rapidly rises up as shown by part A''' of line A in FIG. 7(a), and the front brake 10 is substantially engaged at this timepoint. By this timing arrangement, only a relatively small reduction of the torque of the output shaft is caused during downshifting as shown by curve C'' in FIG. 7(c) and a smooth downshifting is accomplished. In FIG. 7, broken lines show the behavior of the oil pressure in the oil servo means 10' and of the torque of the output shaft which will be obtained when the transmission does not incorporate the timing arrangement of the present invention. That is, if the present invention is not incorporated, the front brake 10 is substantially engaged while the rear clutch 6 is still substantially engaged, whereby the torque of the output shaft is greatly reduced so as temporarily to become negative thereby causing a strong shock in the downshifting.

As will be appreciated from the foregoing, in accordance with the present invention the timing of engagement and disengagement of the two reciprocally operated friction engaging means in an automatic transmission is desirably adjusted by a simple and less expensive electo-mechanical device incorporated in only one of the two oil supply systems for the oil servo means of the two reciprocally operating friction engaging means.

Although the invention has been shown and described with respect to a preferred embodiment thereof, it should be understood by those skilled in the art that various changes and omission of the form and detail thereof may be made therein without departing from the scope of the invention.

We claim:

1. An automatic transmission for automobiles, comprising a housing having an opening therethrough, an input shaft, and output shaft, a gear means having a power input element, a first friction engaging means including a first oil servo means and selectively connecting said input shaft with said power input element, a second friction engaging means including a second oil servo means and selectively braking said power input element, the engagement of said first friction engaging means effecting a first speed stage while the engagement of said second friction engaging means effects a second speed stage, said second friction engaging means having first and second mutually engageable friction elements and a spline member which engages said first friction element, a projection fixedly secured to said spline member and extending substantially radially therefrom so as to pass through said opening in said housing, said spline member being mounted to said housing to be rotatable in it with respect to it through a small angle, said second friction element being connected with said power input member, said power input member being driven by said input shaft in a first rotational direction when said first friction engaging means is engaged in engine driving, said power input member being driven by said output shaft in said first rotational direction when said second friction engaging means is engaged in engine braking, said power input member being driven by the reaction to rotation of said output shaft in a second rotational direction opposite to said first rotational direction when said second friction engaging means is engaged in engine driving, a load cell actuated by said projection when said projection is driven in one of said first and second rotational directions so as to generate an electric signal, and an oil pressure circuit means including a source means of oil pressure, a shift valve for changing over supplying of oil pressure from said source means to one of said first and second oil servo means while changing over exhausting of oil pressure from the other of said first and second oil servo means, a pressure modulating valve which has first and second ports and produces a reduced pressure of a predetermined level at said second port from the oil supplied to said first port from said source means, a passage which connects said shift valve and said second oil servo means and which includes a main passage and a bypass passage, said bypass passage including said pressure modulating valve, and a timing valve which changes over said passage between said main passage and said bypass passage in accordance with said electric signal so that said timing valve changes over said passage to said main passage when said projection is driven in said second rotational direction and said timing valve changes over said passage to said bypass passage when said projection is driven in said first rotational direction.

2. The transmission of claim 1, wherein said pressure modulating valve has a drain port which is opened when the oil pressure in said second port would exceed said predetermined level.

* * * * *